C. S. LOCKWOOD.
DIVIDED CAGE FOR ROLLER BEARINGS.
APPLICATION FILED AUG. 15, 1913.
1,137,010.
Patented Apr. 27, 1915.
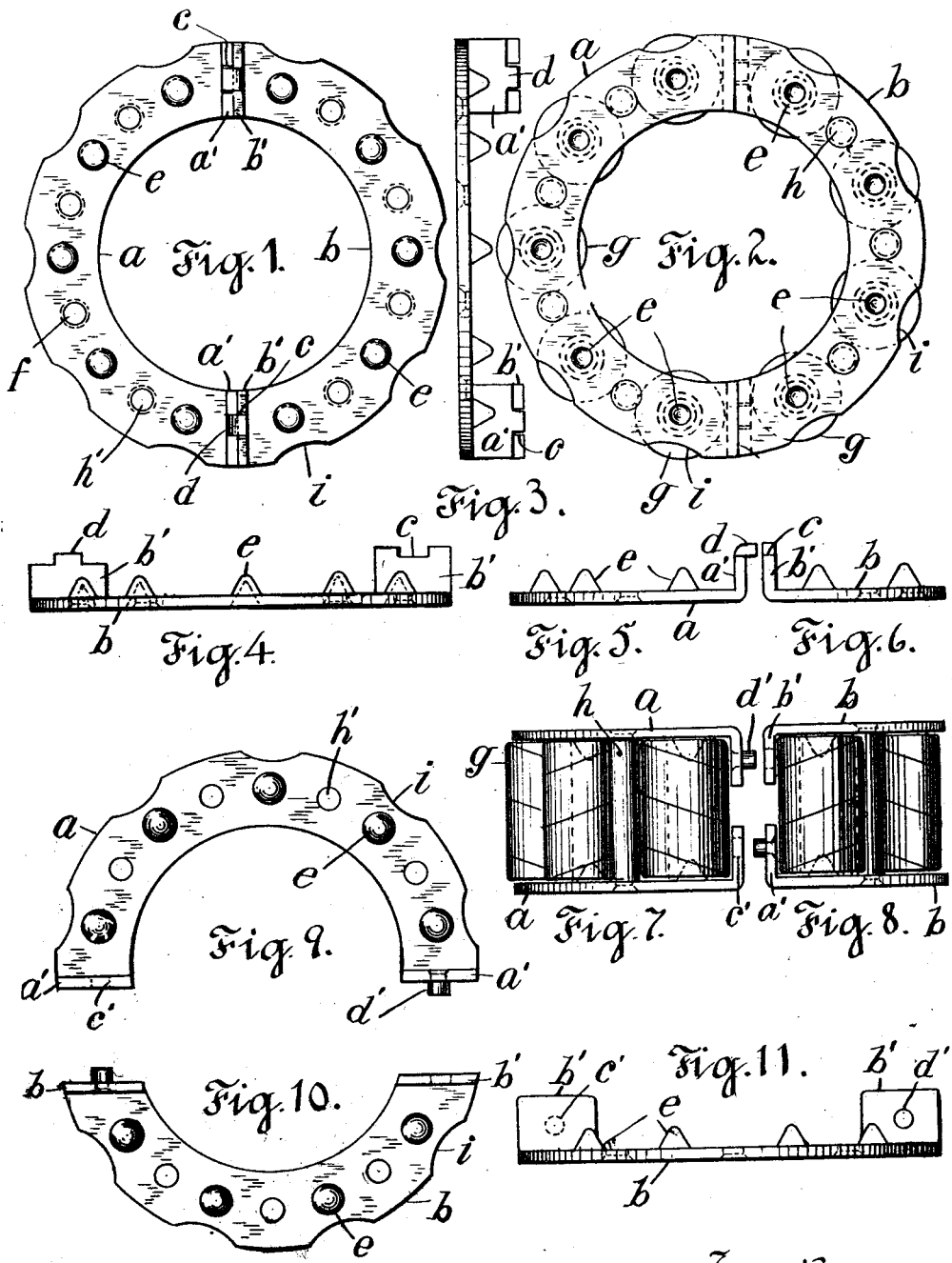

UNITED STATES PATENT OFFICE.

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

DIVIDED CAGE FOR ROLLER-BEARINGS.

1,137,010.  Specification of Letters Patent.  Patented Apr. 27, 1915.

Application filed August 15, 1913. Serial No. 784,860.

*To all whom it may concern:*

Be it known that I, CHARLES S. LOCKWOOD, a citizen of the United States, residing at 289 Market street, Newark, county of Essex, and State of New Jersey, have invented certain new and useful Improvements in Divided Cages for Roller-Bearings, fully described and represented in the following specification and the accompanying drawings, forming a part of the same.

The present invention relates to an improved construction for the roll-sets of a roller-bearing, whereby it may be divided longitudinally so that the opposite sections of the bearing can be readily applied to opposite sides of a shaft, where the end of the shaft is not exposed. It is common to provide the rollers in such a bearing with a cage to hold the rolls in a working position within the bearing, and also to retain the rollers in the cage when separated from the bearing so as to be safely handled in transportation; and the object of the present invention is to furnish such a cage formed in two sections each with a part of the rolls therein, and each provided with means for guiding the rolls, and with connections for securing the sections detachably together, and without forming any projections upon the outer sides of the cage-heads which would necessitate a lengthening of the casing or housing of the bearing. In my construction no screws, rivets or other devices are required for fastening the two halves of the cage-heads together, but I employ lugs turned inwardly at right angles upon the divided edges of the head and arranged to lie in spaces between the rollers to serve as guides. I provide the lugs with interlocking projections and sockets to detachably engage one another.

The invention is especially applicable to spirally wound rolls which have an open bore, as the heads in my invention are provided with conical studs which may enter the bores of the rollers and hold them loosely in the cage.

The exteriors of the rollers are made truly cylindrical but the bores are not, and such studs would not therefore be suitable guiding agents; and I therefore connect the sections of the cage-heads separately by tie-rods fitted between the rollers, so that the opposite side of each roller is contiguous to a tie-rod, and is guided efficiently thereby.

The invention will be understood by reference to the annexed drawing, in which—

Figure 1 shows the inner side of a head divided on the center line and constructed to carry ten rollers; Fig. 2 shows a cage composed of two heads carrying nine rollers and therefore divided at one side of the center line; Fig. 3 is an edge view of one of the heads shown in Fig. 1 or Fig. 2 viewed transverse to the dividing line; Fig. 4 is a similar view of one section alone; Fig. 5 is an end-view of the left-hand section shown in Fig. 2; and Fig. 6 an end-view of the right-hand section of the nearer cage-head. The previously mentioned figures have a bent tongue upon one of the section lugs and a socket-notch upon the opposed lug to receive the said tongue. Figs. 7 to 11 show cage-heads having the opposed lugs provided respectively with a pin and a round socket to receive the same; Fig. 7 showing a plan of the left-hand side of such a cage, and Fig. 8 a plan of the right-hand side of such a cage. Figs. 9 and 10 show the inner sides of cage-head sections like those of the cage shown in Figs. 7 and 8; and Fig. 11 shows the edge of one of such sections viewed transversely to the dividing line.

In Figs. 1 to 6, the opposed halves of the cage-head sections are marked $a$ and $b$; the lugs that are turned inwardly upon their adjacent ends are marked respectively $a'$ and $b'$, and one of the lugs upon each of the sections is provided with an open notch or socket $c$ and the other lug with a tongue $d$ bent at right angles to the lug to fit into such socket. The lugs upon each section of the cage-head lie in the same plane so that they form flat surfaces to meet the opposed lugs upon the opposite section, and only one lug upon each of the sections is provided with the socket $c$, so that both sections may be made identical when the head is divided upon the center line, as shown in Fig. 1. Such arrangement of the tongue and socket is immaterial where the cage-head is divided at one side of the center, as shown in Fig. 2; and Figs. 2 and 3 therefore show both of the tongues upon one of the sections and both of the sockets upon the opposed section.

The cage-head in Fig. 2 is shown with five studs $e$ upon the left-hand section, and with four studs $e$ upon the right-hand section, so as to carry nine rollers $g$ in the cage, and each section is provided with holes $h'$ (see Fig. 1) intermediate the studs to receive tie-bars $h$, as shown in Figs. 2, 7 and 8. The rolls are shown of hollow form.

When the heads are made of sheet-metal, the studs are stamped inwardly from the substance of the metal in conical form as shown in Fig. 4, the shading in Figs. 1, 9 and 10 showing the body of the stud; while the shading in Fig. 2 shows the hollow interior of the stud.

In Fig. 1, each section of the head has five studs $e$ so as to carry ten rollers in the cage, and each head has four of the holes $f$ to receive a tie-bar $h$.

The tie-bars are proportioned, as shown in Fig. 2, to lightly touch the opposite sides of the rollers, which is necessary to form guides for the rollers, as the studs $e$ are not adapted to serve as guides. The lugs $a'$ and $b'$ are projected inwardly upon the head between adjacent rollers in the cage, and thus avoid any projections upon the exterior of the cage which would require space in the housing. Such lugs are proportioned, as shown in Figs. 1, 7 and 8, to fit between the adjacent rollers in the same manner as the tie-rods, and thus serves as guides in the place of the tie-rods at the points where the cage is divided.

In Figs. 7 to 11, one lug upon each of the cage-sections is provided with a projecting pin $d'$ and the other lug with a hole $c'$ to receive the same, such projections and sockets operating the same as the tongue $d$ and notch $c$, to hold the sections detachably in line with one another when they are applied to one another at opposite sides of the shaft. The flat faces of the lugs are opposed, (during the act of applying them to the shaft), as shown in Figs. 7 and 8, and these figures show that each half of the roll-set is a self-contained structure comprising the cage-head sections, the tie-bars connecting the same and the rollers are held movably upon the studs.

The parts may thus be sold as a new article of manufacture and may be handled with the same security against loss of parts, as if the cage-heads were in a single piece.

In Figs. 1 and 9, notches $i$ are shown in the periphery of the cage-heads adjacent to the studs $e$, which brings the notch over the ends of the rollers $g$ as shown in Fig. 2. The purpose of such notches is to furnish access for oil or grease to the rollers when arranged in the housing of the bearing, and also to furnish an exit for particles of foreign matter to escape when the bearing is cleansed with kerosene or other fluid while it is in the housing. The exterior of the cage-heads is shown in Fig. 2 nearly on a line with the outer sides of the rolls, so as to fit close to the inner side of the bearing in which the rollers operate, and such construction for the cage-heads prevents the free access of lubricant and the exit of foreign matter, unless the heads are provided with such notches $i$.

It will be noticed that the cage-heads thus described may be used with rollers of any length by suitably proportioning the length of the tie-bars $h$, and the structure thus differs from any in which the heads are connected by integral tie-bars, and permits the carrying of the cage-heads in stock and their assembling with rollers of different lengths, to fill orders for different kinds of bearings.

It will be noted that, in addition to the engagement of the cage-sections by the lugs, the lugs perform a special function in guiding the rollers which lie in proximity to them in the casing; thus compensating for the absence of the guiding tie-bars at the joint of the cage.

Having thus set forth the nature of the invention, what is claimed herein is:

1. A roll-set for a roller bearing, comprising sheet-metal heads of annular form divided each into two sections, studs upon the heads, a set of tubular rollers held in the cage thereby, tie-rods connecting such head-sections separately between the said rollers and fitted to guide the same, and lugs turned inwardly upon the divided edges of the heads and lying in spaces between the rollers and provided with loosely detachable connection, whereby the cage-sections are held together without any projections upon the outer sides of the cage-heads.

2. A roll-set for a roller bearing, comprising sheet-metal heads of annular form divided each into two sections, studs upon the heads, a set of tubular rollers held in the cage thereby, tie-rods connecting such head-sections separately between the said rollers and fitted to guide the same, and lugs turned inwardly upon the divided edges of the heads and lying in spaces between the rollers and provided with loosely detachable connection, such lugs operating as guides for the adjacent rollers conjointly with the tie-rods and the roll-set thus forming when separated from the shaft, two separate self-contained half roll-sets adapted for insertion in a bearing at opposite sides of the shaft.

In testimony whereof I have hereunto set my hand in the presence of two subscribing witnesses.

CHARLES S. LOCKWOOD.

Witnesses:
 ALFRED P. SLOAN, Jr.,
 H. E. SAUL.